United States Patent
Torrisi et al.

(10) Patent No.: US 9,436,193 B2
(45) Date of Patent: Sep. 6, 2016

(54) ELECTRIC SYSTEM COMPRISING A LOAD DRIVING APPARATUS BY AUTO-RECOVERY MODE, AND METHOD OF OPERATING THE APPARATUS

(71) Applicant: STMICROELECTRONICS S.R.L., Agrate Brianza (IT)

(72) Inventors: Giovanni Luca Torrisi, Aci Catena (IT); Domenico Massimo Porto, Catania (IT); Vanni Poletto, Casale Monferrato (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 315 days.

(21) Appl. No.: 14/138,402

(22) Filed: Dec. 23, 2013

(65) Prior Publication Data

US 2014/0184185 A1  Jul. 3, 2014

(30) Foreign Application Priority Data

Jan. 3, 2013 (IT) .............................. M12013A0001

(51) Int. Cl.
| | | |
|---|---|---|
| *G05F 1/46* | (2006.01) | |
| *H02H 1/04* | (2006.01) | |
| *H02H 9/00* | (2006.01) | |
| *H02H 3/02* | (2006.01) | |
| *H02H 9/02* | (2006.01) | |

(52) U.S. Cl.
CPC .............. *G05F 1/462* (2013.01); *H02H 1/043* (2013.01); *H02H 3/025* (2013.01); *H02H 9/002* (2013.01); *H02H 9/025* (2013.01)

(58) Field of Classification Search
CPC ....... G05F 1/573; H02H 1/043; H02H 3/025
See application file for complete search history.

(56) References Cited

U.S. PATENT DOCUMENTS

| | | | | |
|---|---|---|---|---|
| 3,898,549 A | * | 8/1975 | Mitchell ............. | H02M 3/3378 327/175 |
| 4,385,263 A | * | 5/1983 | Luz ........................ | H04N 3/185 315/208 |
| 4,639,609 A | * | 1/1987 | Floyd .................. | B60R 16/0315 307/10.1 |
| 5,521,838 A | * | 5/1996 | Rosendahl ................ | H02J 3/14 307/35 |
| 5,559,375 A | * | 9/1996 | Jo ........................ | H02H 7/0838 307/10.1 |
| 5,666,044 A | * | 9/1997 | Tuozzolo ................ | G05F 1/573 323/273 |
| 5,894,394 A | * | 4/1999 | Baba ...................... | H02H 1/043 361/100 |
| 5,949,663 A | * | 9/1999 | Endo ..................... | H02M 7/003 363/37 |
| 6,037,826 A | * | 3/2000 | Poletto .................... | G05F 1/569 327/375 |

(Continued)

FOREIGN PATENT DOCUMENTS

EP  2515613  10/2012

*Primary Examiner* — Timothy J Dole
*Assistant Examiner* — Yusef Ahmed
(74) *Attorney, Agent, or Firm* — Allen, Dyer, Doppelt, Milbrath & Gilchrist, P.A.

(57) ABSTRACT

A driver for an electric load includes a power device having a control terminal and an output terminal for an output current, and a control module. The control module is configured to drive the power device in an auto-recovery mode by switching between activation and deactivation in the occurrence of an overcurrent condition, wherein the output current reaches a threshold current. The control module is also configured to evaluate a first time interval between a time wherein the overcurrent condition occurs, and a first time, and generate a limit signal when the time interval is equal to a time threshold. The power device is driven in a switching-off condition at least as a function of the limit signal.

25 Claims, 7 Drawing Sheets

(56) References Cited

U.S. PATENT DOCUMENTS

| | | | | |
|---|---|---|---|---|
| 6,054,738 | A * | 4/2000 | Sander | H01L 27/0251 257/133 |
| 6,141,197 | A * | 10/2000 | Kim | H02H 1/063 361/102 |
| 6,219,270 | B1 * | 4/2001 | Van Geloven | G11C 11/404 365/149 |
| 6,320,275 | B1 * | 11/2001 | Okamoto | B60L 3/04 307/10.1 |
| 6,414,459 | B1 | 7/2002 | Borho et al. | |
| 6,556,901 | B2 * | 4/2003 | Sugimura | F01P 11/16 701/33.6 |
| 6,832,148 | B1 * | 12/2004 | Bennett | B60K 6/445 180/65.225 |
| 6,992,452 | B1 * | 1/2006 | Sachs | H02K 11/0073 318/434 |
| 7,079,368 | B2 * | 7/2006 | Ishikawa | H03K 17/0822 361/93.1 |
| 7,262,628 | B2 * | 8/2007 | Southwell | H02M 3/1584 323/266 |
| 7,468,874 | B1 * | 12/2008 | Guo | H03K 17/0822 361/88 |
| 7,928,665 | B2 * | 4/2011 | Olson | G09G 3/3406 315/224 |
| 7,940,505 | B1 * | 5/2011 | Sadate | H03K 17/0822 361/103 |
| 8,035,943 | B2 * | 10/2011 | Turpin | H02H 3/087 361/101 |
| 8,315,027 | B2 * | 11/2012 | Sugimoto | H03K 17/0822 361/100 |
| 2003/0063420 | A1 * | 4/2003 | Pahl | H02H 1/0015 361/93.1 |
| 2003/0151929 | A1 * | 8/2003 | Figueroa | H02M 3/33507 363/21.01 |
| 2004/0070910 | A1 * | 4/2004 | Gergintschew | H03K 17/0822 361/103 |
| 2004/0228057 | A1 * | 11/2004 | Mayama | H03K 17/0822 361/100 |
| 2005/0135121 | A1 * | 6/2005 | Hamilton | H02M 1/32 363/22 |
| 2006/0120000 | A1 * | 6/2006 | Fiesoli | H02H 3/025 361/93.1 |
| 2006/0227590 | A1 * | 10/2006 | Parkinson | G11C 7/062 365/148 |
| 2007/0013361 | A1 * | 1/2007 | Burlak | H02M 1/32 324/142 |
| 2007/0097566 | A1 * | 5/2007 | Woods | B24B 23/028 361/33 |
| 2008/0219031 | A1 * | 9/2008 | Kernahan | H02M 1/15 363/21.01 |
| 2009/0147420 | A1 * | 6/2009 | Graf | H03K 17/0822 361/56 |
| 2009/0273954 | A1 * | 11/2009 | Walde | H02M 1/32 363/56.01 |
| 2010/0001675 | A1 * | 1/2010 | Matsunaga | H02P 29/00 318/446 |
| 2010/0085675 | A1 * | 4/2010 | Oki | H02M 1/08 361/101 |
| 2010/0213859 | A1 * | 8/2010 | Shteynberg | H05B 33/0815 315/224 |
| 2010/0244800 | A1 * | 9/2010 | Nakamura | H02M 3/156 323/284 |
| 2010/0328831 | A1 * | 12/2010 | Zhang | H02M 1/32 361/93.1 |
| 2011/0058285 | A1 * | 3/2011 | Wibben | H02M 1/32 361/18 |
| 2011/0058297 | A1 * | 3/2011 | Higashida | H03K 17/0822 361/93.9 |
| 2011/0156610 | A1 * | 6/2011 | Ostrovsky | H05B 39/083 315/291 |
| 2012/0081825 | A1 * | 4/2012 | Nakamura | H02H 7/228 361/93.8 |
| 2012/0170166 | A1 * | 7/2012 | Nagasawa | H02H 3/066 361/92 |
| 2012/0319488 | A1 * | 12/2012 | Yu | G06F 1/32 307/66 |
| 2013/0089223 | A1 * | 4/2013 | Heineman | H03F 1/26 381/120 |
| 2013/0249518 | A1 * | 9/2013 | Giannopoulos | H02M 3/156 323/284 |
| 2014/0225580 | A1 * | 8/2014 | Carbonini | G05F 1/575 323/280 |

\* cited by examiner

ELECTRIC SYSTEM COMPRISING A LOAD DRIVING APPARATUS BY AUTO-RECOVERY MODE, AND METHOD OF OPERATING THE APPARATUS

FIELD OF THE INVENTION

The present description refers to electric load driving techniques which can operate in an auto-recovery mode, known also as "auto-restart". Particularly, the present description refers to the detection and management of short-circuit or overload conditions.

BACKGROUND OF THE INVENTION

There are electric loads requiring for their starting-up or switching-on a current, known as "start-up current", which can reach values which cannot be supplied by some types of power devices adapted to drive loads. Particularly, lateral flow power transistors, such as those manufactured by the BCD technology (Bipolar CMOS DMOS), as opposed to VIPower transistors, may not be capable of sustaining start-up currents of some types of loads, such as those used, for example, on motor vehicles, incandescent lamps or, generally, linear loads. These power transistors, operating as switches, manage the starting-up or switching-on step of the load by applying the auto-recovery mode.

According to the auto-recovery mode, when the current absorbed by the load reaches a predetermined threshold value, the power transistor is switched many times between the switching-off and starting-up, to supply the load with a current having a PWM-type trend and taking a maximum value not greater than the threshold value. The average current supplied to the load in the auto-recovery mode is such as to take it, during a suitable time range and without anomalies, to the standard operation. Indeed, when the maximum current absorbed by the load in a PWM cycle is less than the threshold value, the auto-recovery mode is interrupted and the power transistor remains switched to supply a nominal current to the electric load.

Electronic circuits on which power devices for driving electric load are integrated, offering the capability of operating in an auto-recovery mode, are often managed by a microcontroller outside the integrated circuit, such as, for example, the central unit of a car. Typically, such an outer or external microcontroller is capable of adopting protection provisions entailing the switching-off of the power devices in the presence of particular abnormal conditions.

Moreover, power devices, such as MOSFETs, driving loads have the capability of switching off when non-sustainable junction temperatures are reached, by performing a so-called thermal shut down. The occurrence of abnormal operation conditions are observed in which the power transistor does not supply the load which it was designed for, but instead supplies a short-circuit or an overload.

According to standard driving techniques, the short-circuit or overload conditions leading to an overcurrent state, are managed based on the auto-recovery mode until the occurrence of a temperature increase such as to cause the thermal shut down.

SUMMARY OF THE INVENTION

The Applicant has observed the standard techniques, based on the auto-recovery and thermal shut down, may not be adequate with reference to the management of anomalies caused by an overload and short-circuit. Specifically, standard techniques may not ensure life cycles which are sufficiently long for the power devices supplying electric loads.

Accordingly, a driving apparatus is described herein for an electric load to address the shortcomings of the standard techniques. The driving apparatus may include a power device having a control terminal and an output terminal for an output current to be supplied to the electric load, and a control module configured to drive the power device in an auto-recovery mode, by switching between activation and deactivation for the occurrence of an overcurrent condition, wherein the output current reaches a threshold current. The control module may also evaluate a first time interval; generate a limit signal when the time interval is equal to a time threshold; and drive the power device to a switching-off condition at least as a function of the limit signal. The time interval is between a time wherein the overcurrent condition occurs, and a first time.

BRIEF DESCRIPTION OF THE DRAWINGS

To better understand the embodiments and appreciate their advantages in the following some will be described in an exemplifying non-limiting way, referring to the attached drawings, wherein.

DETAILED DESCRIPTION OF THE EMBODIMENTS

Figure 1:
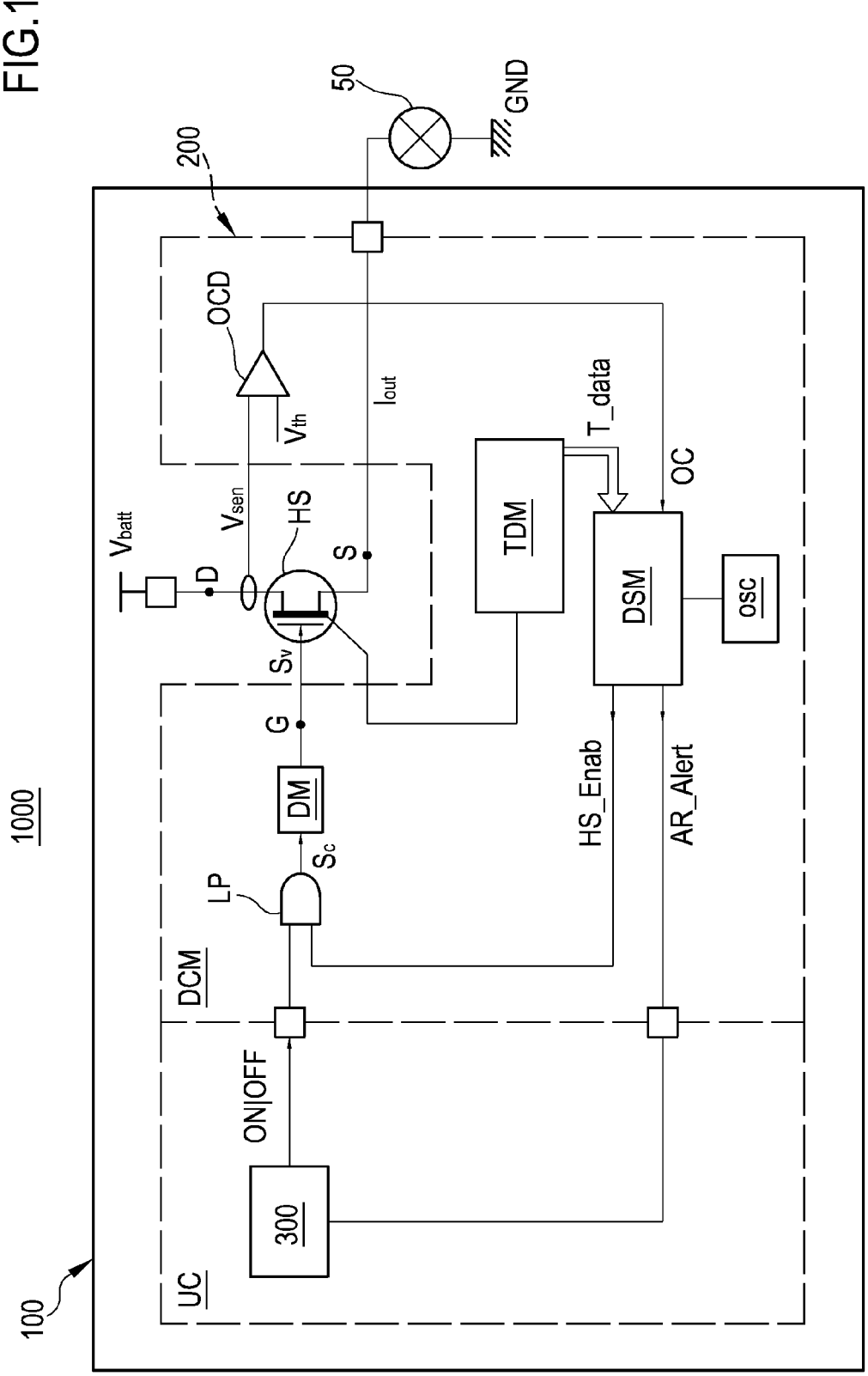
FIG. 1 shows a particular embodiment of an electric system comprising a power device and electric load in accordance with the invention.

FIG. 1 shows a particular embodiment of an electric system 1000 comprising an electric load 50 and an apparatus 100 for driving the load 50. The electric load 50 can be, for example, an additional electric component of the type mountable to a motor vehicle, such as, in particular, an incandescent lamp attachable to a car door, or a blinker attachable to a rearview mirror. The electric load 50 has a terminal connected to the driving apparatus 100 and another terminal connected to a ground terminal GND.

The driving apparatus 100 comprises: a power device HS and control module 200. More specifically, the power device HS can comprise, for example, a power transistor, such as a MOSFET (Metal Oxide Semiconductor Field Effect Transistor) as shown in FIG. 1. In the described particular example, transistor HS comprises a gate terminal G connected to the control module 200, a source terminal S connected to the electric load 50 for supplying an output current $I_{out}$ and a drain terminal D connected to a supplying terminal for receiving a supply voltage $V_{batt}$ supplied by a battery.

The power transistor HS operates as a switch and, in the described example, is connected according to the high-side configuration, showing the source terminal S connected to load 50. Particularly, part of control module 200 comprising the MOSFET transistor HS is obtained by integration on a chip made of semiconductor material by BCD technology (Bipolar C-MOS D-MOS) and is of a "side flow" type. Other power devices adapted to drive other loads, not shown in figure, can be integrated on such a chip.

The load 50 is of a type which requires for its starting-up/switching-on a start-up current. For example, for power loads between 5-10 W, the start-up current can reach maximum values between 4 A and 7 A.

The control module 200 is such as to enable driving the power device HS according to the so-called auto-restart mode known also as the auto-recovery mode. According to the auto-recovery mode, the control module 200 performs the following steps:

a) it drives the activation (that is switching on) of the module of the power device HS, and after a switching-on time interval $T_{on}$, compares the output current value $I_{out}$ to a threshold current $TH_c$;

b) it deactivates, that is turns off, the power device HS, if an overcurrent condition is detected, in other words, if it is verified the condition wherein the output current $I_{out}$ is equal to or greater than a threshold current $TH_c$; and c) it keeps deactivated the power device for an overcurrent filtering time interval $T_{off}$ and at the end of it the operation goes back to step a).

The deactivation of the power device HS when the current threshold $TH_c$ is reached/exceeded is an action whose object is to protect the integrity of the power device avoiding damage when it is supplying non sustainable currents.

Figure 2:
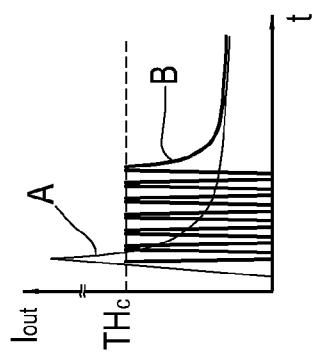
FIG. 2 schematically shows the trend of a start-up current of a resistive load and the trend of the output current of the power device as shown in FIG. 1 in the auto-recovery mode.

FIG. 2 shows, in an exemplifying way, a first curve A representing the time trend of a start-up current Inrush, as this would be without the auto-recovery mode. Further, FIG. 2 shows, as an example, a second curve B representing the output current $I_{out}$ trend in an implementation of the auto-recovery mode. FIG. 2 refers to an illustrative example of a resistive-type load 50.

When the output current $I_{out}$ reaches the current threshold $TH_c$, the control module 200 sets the auto-recovery mode and the power device HS is switched between activation and deactivation. As is apparent from the second curve B, in the auto-recovery mode for a resistive type load 50, the current Iout takes a PWM-type pulse trend, which can have a predetermined duty cycle set by times $T_{on}$ and $T_{off}$.

The auto-recovery mode, comprising the power device HS switchings between activation and deactivation as described before, can be employed not only in the load 50 starting-up step, but also in the following operation steps when the conditions occur, except for different operative modes set by control module 200 for managing particular anomalies.

As will be better understood in the following description, the control module 200 is capable of managing anomalies, such as those caused by the presence of a short-circuit or overload at the source terminal S and a temperature increase in the power device HS and/or chip which it is integrated on.

Relating to this, it is observed that an overcurrent condition wherein output current $I_{out}$ exceeds current threshold $TH_c$, can occur not only because the load 50 can require a particularly high start-up current, but also in the presence of anomalies such as a short-circuit or overload at the source terminal S of power device HS.

Referring again to control module 200, it is capable of evaluating a time interval $T_I$ between an instant in which output current $I_{out}$ reaches threshold current $TH_c$, that is when an overcurrent condition is detected, at a present time instant.

Further, the control module 200 is configured to compare this time interval $T_I$ with a time threshold $TH_{Ti}$ and, if the time interval $T_I$ has reached the time threshold, generate a limit signal indicating an overcurrent condition is present for a time interval $T_I$ equal to the time threshold. This limit signal can be used by the control module 200 for driving the power device HS to the switching-off, according to different possible modes that will be described below.

Particularly, referring again to FIG. 1, the control module 200 comprises a control and drive module DCM and a control unit UC. More particularly, control and drive module DCM comprises a management module DSM and driving circuit DM. Particularly, control and drive module DCM comprises an overcurrent detecting circuit OCD and temperature detecting module TDM.

The control and drive module DCM and the power device HS can be integrated on the same chip by BCD technology, while the control unit UC comprising, for example, a microcontroller 300, is outside such a chip. The control unit UC is, for example, the main microcontroller of a motor vehicle.

The management module DSM is configured to receive, from the overcurrent detecting module OCD, an overcurrent signal OC, and receive from the temperature detecting module, a temperature measuring signal T_data, representing the temperature reached by the power device HS.

Based upon the overcurrent signal OC the management module DSM is capable of supplying a warning signal AR_Alert indicative of the presence or absence of an overcurrent condition. For example, upon starting up the power device HS, the warning signal AR_Alert takes a logic value 0, and when an overcurrent condition is detected, the warning signal AR_Alert takes a logic value 1.

Moreover, as shown in FIG. 1, the management module DSM can also supply an enabling signal HS_Enab adapted to deactivate, that is switch off power device HS, or enable its activation. For example, the logic value 1 of the enabling signal HS_Enab corresponds to an enabling of the power device HS activation, while the logic value 0 corresponds to a disabling, that is to a deactivation command, of the power device HS.

The management module DSM implements a control law and is, for example, a finite state machine which can be implemented by a software module executed by a corresponding processing unit, or is embodied by logic implemented by a combinatorial digital machine comprising logic components such as, for example, AND, OR, NOR, NOT gates, and other components such as counters, incrementable registers, flip-flops, and similar devices. The management module DSM may be implemented by a FPGA (Field Programmable Gate Array) board. The management module DSM is timed by a clock signal supplied by an oscillator OSC.

The microcontroller 300 is connected to management module DSM for receiving the warning signal AR_Alert, and further for supplying, to the control and drive module DCM, a command signal ON/OFF adapted to command the switching-on and off of the power device HS. For example, the logic value 1 of the command signal ON/OFF corresponds to the command for switching on the power device HS, while the logic value 0 corresponds to the command for switching off the power device HS.

The microcontroller 300 is capable of implementing protection provisions involving the switching off of power device HS when particular conditions occur. In these instances, microcontroller 300 can perform the switching-off by taking the command signal ON/OFF to a value equal to 0.

It is noted power device HS comprises a circuit capable of detecting the temperature, managing a thermal protection mode by performing a thermal shut down (TDS) of power device HS itself in case it is detected a temperature value greater than a thermal safety threshold $TH_{TSD}$.

Management module DSM comprises a logic port LP, for example, of the AND type, configured to receive at its input the enabling signal HS_Enab and command signal ON/OFF, and supply a combined command signal $S_c$ corresponding to an AND logic combination of input signals.

For example, the combined command signal $S_c$ will take a logic value 1 for commanding power device HS to switch on (or equally switch off) when both enabling signal HS_Enab and command signal ON/OFF have taken logic value 1. While combined signal $S_c$ will take logic value 0 for commanding power device HS to switch on (or equally switch off) in any other combination of logic values taken by enabling signal HS_Enab and command signal ON/OFF.

The driving circuit DM is configured to receive at its input combined command signal $S_c$ and supply a corresponding driving signal $S_v$, such as a voltage, at gate terminal G of power device HS.

The driving circuit DM, which can be of a standard type, can comprise an amplifier enabling to convert combined command signal $S_c$ into a current or voltage $S_v$ adapted to the operation of the power device HS and its switching between activation and deactivation DM. Particularly, such an amplifier included in driving circuit DM increases the electric current associated to the combined command signal $S_c$ (which is for example of few mA) to a value such as to charge the gate capacitance of the MOSFET HS.

Comparing module OCD comprises an operational amplifier having a first input, for example, its non inverting terminal, connected for example, by a sense resistor (not shown) to the drain terminal D of the power device HS for drawing a sense voltage $V_{sen}$ indicating the output current $I_{out}$ flowing through the power device HS and load 50 to the ground terminal GND. The inverting terminal of operational amplifier receives a threshold voltage $V_{th}$ related to the predetermined threshold current $TH_c$. According to another embodiment, the comparing module OCD is such as to compare a reference electric current with a sensed electric current, for example, by an inductive sensor, from drain terminal D.

Based on the comparison between the sense voltage $V_{sen}$ and the threshold voltage $V_{th}$ performed by the operational amplifier of the overcurrent detecting module OCD, conditions of overcurrent or absence of overcurrent are detected by generating the overcurrent signal OC. For example, such an overcurrent signal OC can take a logic value 1 when an overcurrent condition is detected, while it takes logic value 0 when an overcurrent absence is detected.

Figure 3:
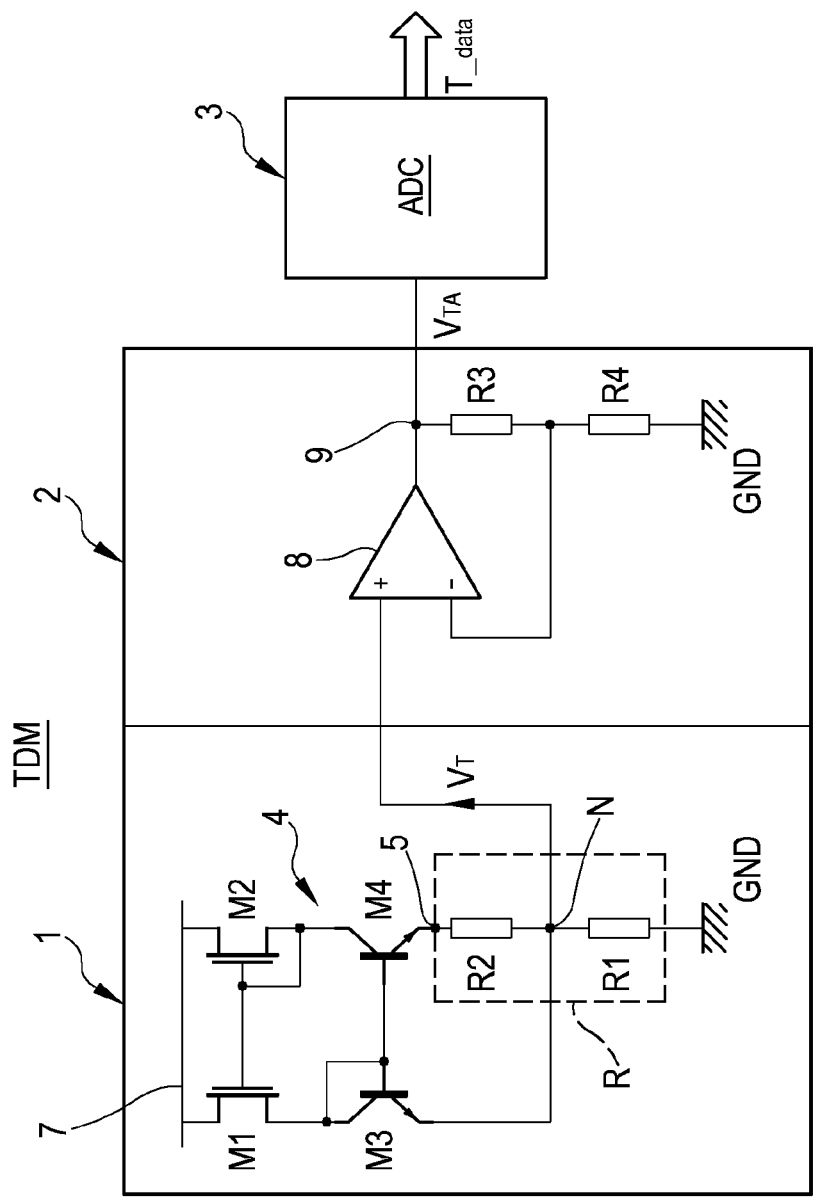
FIG. 3 shows a particular embodiment of a module for detecting the temperature, usable in the driving apparatus.

According to a first embodiment of the driving apparatus 100, providing a measurement of a temperature increase in power device HS, temperature detecting module TDM can be embodied as shown in FIG. 3. According to such a first embodiment, the detecting module 9 comprises a detector 1, amplifier stage 2, and an analog-to-digital converter 3.

The detector 1 is configured to supply at a first output terminal N, a measurement electric voltage $T_T$ proportional to the temperature in the power device HS.

Particularly, the detector 1 comprises a bandgap voltage reference circuit 4 connected to a module receptive to the temperature, comprising a first resistor R1, connected between ground terminal GND and first output terminal N, and a second resistor R2 connected between first output terminal N and second output terminal 5 of bandgap voltage reference circuit 4. First and second resistors R1 and R2 have relative electrical resistances which change as temperature changes.

Bandgap voltage reference circuit 4, a conventional one per se, comprises a first MOSFET transistor M1 and second MOSFET transistor M2 forming a first current mirror. First current mirror M1-M2 is connected to a supply terminal 7 and to a second current mirror formed by a third transistor M3 and a fourth transistor M4, both, particularly, of the bipolar type. The emitter terminal of third transistor M3 is connected to first output terminal N, while the emitter terminal of fourth transistor M4 is connected to second output terminal 5.

Second mirror current M3-M4 is configured so that the fourth transistor M4 supplies to a second output terminal 5 a current equal to the one supplied by third transistor M3 to first output terminal N multiplied by a factor A. For example, A is between 1 and 10, but could be also greater than 10.

By suitably balancing the values of resistances of the first and second resistors R1 and R2, the detector 1 operates as a voltage reference at a temperature of 0° K, by generating for this temperature value a measurement electric voltage $V_T$ equal, for example, to 1.22 V. Factor A, that is the ratio between currents in current mirror M3-M4, enables setting the measurement sensitivity. For example, by selecting factor A equal to 10, for each increase of 1° K, there is a corresponding increase of 0.2 mV in the measurement electric voltage $V_T$.

Amplifier stage 2 amplifies the measurement electric voltage $V_T$ and supplies at third output terminal 9 an amplified measurement electric voltage $V_{TA}$. For example, the amplifier stage 2 can comprise an operational amplifier 8 having a feedback configuration. The operational amplifier 8 has its corresponding non inverting terminal connected to a first output terminal N for receiving the measurement electric voltage $V_T$, and the corresponding inverting terminal is connected to the third output terminal 9 through a third resistor R3, which, in turn, is connected to the ground terminal GND by a fourth resistor R4.

Third output terminal 9 is connected to an input of the analog-to-digital converter 3 configured to convert the amplified measurement electric voltage $V_{TA}$ into a temperature measurement signal T_data which, in a digital form, represents the temperature measured value reached by the power device HS.

Figure 4:
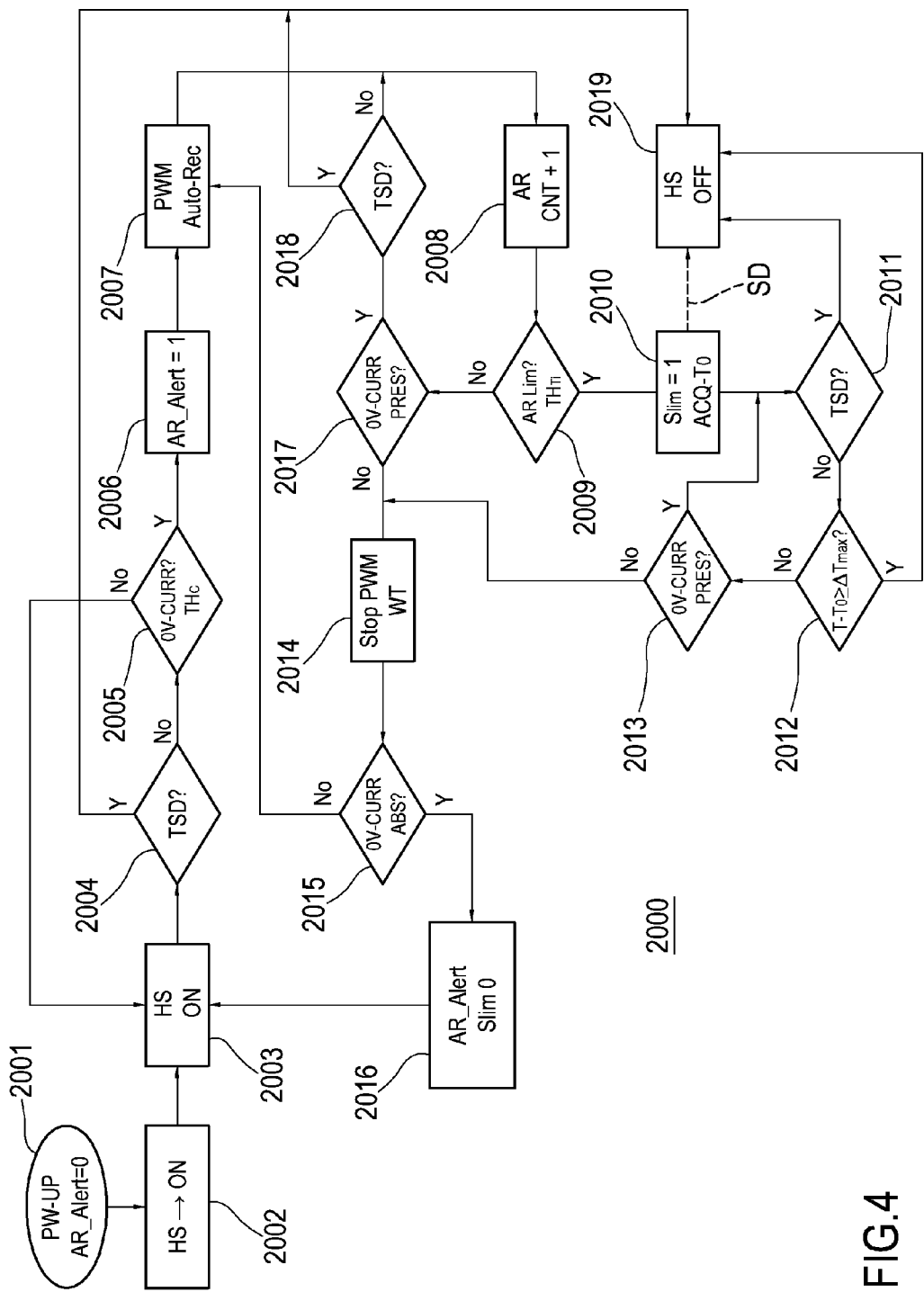
FIG. 4 shows, by a flow chart, a first embodiment of a driving method implementable by the driving apparatus of FIG. 1.

FIG. 4 shows, by a flow chart 2000, a method of operating the driving apparatus 100, and therefore shows also the operative modes of the management module DSM and microcontroller 300, also in the particular case wherein there are anomalies caused by a short-circuit, overload with temperature increments.

The method of FIG. 4 refers to the particular embodiment of driving apparatus 100 which provides a measurement of the temperature increase, and which uses the temperature detecting module TDM as described with reference to FIG. 3.

In a first step 2001 (PW_UP, AR_Alert=0), the control module 200 is connected to the supply terminal for receiving the supply voltage $V_{batt}$, and warning signal AR_Alert takes logic value 0; the value of such warning signal AR_Alert is also stored in a corresponding register in the microcontroller 300.

In a second step 2002 (HS→ON), the microcontroller 300 takes the command signal ON/OFF to a logic value 1, therefore commanding the power device HS to switch on. Further, the management module DSM supplies an enabling signal HS_Enab of logic value 1, so that the driving circuit switches on the power device HS, as shown by a third step 2003 (HS ON).

In a fourth step 2004 (TSD?) upon the switching on, the temperature of the chip in which the power device HS is integrated can exceed or not the thermal safety threshold $TH_{TSD}$. In an affirmative case (branch Y), the power device HS is immediately switched off, and a nineteenth step 2019 (HS OFF) is reached.

If the thermal safety test is negative (branch No), the command signal ON/OFF keeps logic value 1 and the management module DSM executes, in a fifth step 2005 (OV-CURR ?), a test regarding the presence or absence of an overcurrent.

In such fifth step 2005, the management module DSM reads the overcurrent signal value OC and if this value has a logic value 0 (overcurrent is absent), it keeps the enabling signal HS_Enab to a logic value 1, by keeping activated the power device HS and, in other words, operation returns to third step 2003.

When the management module DSM detects from the overcurrent signal OC the presence of an overcurrent (branch Y), it switches the warning signal AR_Alert from a logic value 0 to a logic value 1, in the sixth step 2006 (AR_Alert=1).

As explained before, the presence of overcurrent can be due to the start-up current required by the load 50 or by abnormal conditions of a short-circuit or overload.

Once the overcurrent condition has been detected, there is activated, in a seventh step 2007 (PWM Auto-Rec) the auto-recovery mode managed by the management module DSM by the enabling signal HS_Enab which switches from logic value 1 to 0 and viceversa, by deactivating and activating the power device HS according to a timing set by selected values of switching-on time interval $T_{on}$ and the filtering time interval of overcurrent $T_{off}$.

The microcontroller 300, receiving warning signal AR_Alert, is informed about the performed detection of the overcurrent and about the auto-recovery mode activation.

Moreover, as shown in an eighth step 2008 (AR CNT+1), the management module DSM performs by its counter a calculation of the time interval $T_I$ between an instant in which the overcurrent condition has been detected (by enabling the auto-recovery mode) and a present instant, for example, by a clock signal supplied by an oscillator OSC.

For each increase of one unit of the counter, see ninth step 2009 (AR Lim ?), the value obtained of the time range $T_I$ is compared, by the management module DSM, with the time threshold $TH_{Ti}$.

In case the time range $T_I$ is equal to time threshold $TH_{Ti}$ (branch Y), the method proceeds to a tenth step 2010 (Slim=1, ACQ-$T_0$), in which the management module DSM supplies the limit signal $S_{lim}$ with a logic value equal, for example, to 1, to the microcontroller 300, indicating that the time threshold $TH_{Ti}$ has been reached.

Moreover, in tenth step 2010, the management module DSM acquires from the temperature detecting module TDM, an initial temperature value $T_0$ representing the temperature of the power device HS when it is detected that the time threshold $TH_{Ti}$ has been reached.

It is observed that, as shown in FIG. 4 by a dotted branch SD, the method can provide, according to a particular example, that the microcontroller 300 switches off the power device HS and/or the whole chip on which the power device is integrated, by preventing the auto-recovery mode, arriving in this way to the nineteenth step 2019 (HS OFF), as soon as it receives the limit signal $S_{lim}$ having a logic value equal to 1.

Indeed, the continuation of the auto-recovery condition for a time range equal to the time threshold $TH_{Ti}$ can be considered as indicative of the presence of an anomaly which can lead to a failure in the power device HS.

Returning back to tenth step 2010, the method continues to an eleventh step 2011, in which the thermal safety test is repeated in the same way as described with reference to the fourth step 2004.

If the answer of the safety thermal test is positive (branch Y), the power device HS switches off, so operation reaches the nineteenth step 2019 (HS OFF) and prevents the auto-recovery mode.

In case the answer (branch No) of the thermal safety test is negative, the method preferably arrives to twelfth step 2012 (T–$T_0$>$\Delta T_{max}$ ?) wherein the management module DSM acquires from the temperature detecting module TDM a current value T of the power device HS temperature, and computes the temperature increase T–$T_0$, with respect to the beforehand acquired initial temperature T0.

Moreover, in the twelfth step 2012, the management module DSM compares the temperature increase T–$T_0$ with a thermal variation threshold $\Delta T_{max}$ for determining if the temperature increase T–$T_0$ has reached or exceeded the thermal variation threshold $\Delta T_{max}$.

In the affirmative case, the management module DSM, by switching enabling signal HS-Enab to a logic value 0, commands the power device HS to switch off, so operation reaches the nineteenth step 2019, preventing also the auto-recovery mode.

It is noted that the power device HS switching-off, which follows the twelfth step 2012, is necessary and performed by the management module DSM independently from the external microcontroller 300. Moreover, from a time point of view, the switching-off commanded by the management module DSM can substantially occur before the thermal switching-off (steps TDS, Y), after the thermal safety test.

In case, during the twelfth step 2012, the reaching of thermal variation threshold $\Delta T_{max}$ (branch No) is not detected, there is a thirteenth step 2013 (OV-CURR PRES ?) wherein the management module DSM evaluates again the presence of an overcurrent, by reading the value taken by the overcurrent signal OC supplied by the overcurrent detecting module OCD.

If the overcurrent condition continues (branch Y, step 2013), the method returns to the eleventh step 2011 for performing again the safety thermal test.

In the negative case (branch No) wherein the overcurrent condition has been removed, the method preferably continues to a fourteenth step (2014 Stop PWM-WT) wherein the management module DSM, by the enabling signal HS_Enab, interrupts the auto-recovery mode and takes a waiting state.

For example, this waiting state has a duration equal to two times the period of the overcurrent signal OC acquisition by the management module DSM. At the end of the waiting period, in a fifteenth step 2015 (OV-CURR ABS ?), the management module DSM performs a further test for evaluating if the overcurrent state is still absent. In the negative case (branch No), that is when the overcurrent condition appears again, the method returns to the seventh step 2007 wherein the auto-recovery mode persists.

This fourteenth step 2014, comprising a waiting period before performing a test about an overcurrent presence, has the advantage of avoiding or reducing the possibility that the presence of an intermittent-type short-circuit could be mistaken for a series of independent events, causing in turn a delay in the temperature $T_0$ acquisition.

In the positive case (branch Y, step 2015), that is when overcurrent condition is still absent, in a sixteenth step 2016 (AR_Alert, $S_{lim}$, 0), the management module DSM resets to a logic value 0 both the warning signal AR_Alert and the limit signal $S_{lim}$. The method therefore continues to a third step 2003 wherein power device HS is switched on.

The sixteenth step 2016 corresponds to the situation wherein the auto-recovery mode is successful, and, therefore, there is a correct supply of load 50 and possible abnormal conditions (short-circuit or overload) are absent or have been removed.

Returning to the ninth step 2009, if the time interval $T_I$ is less than time threshold $TH_{Ti}$ (branch No), the method continues to a seventeenth step 2017 (OV-CURR PRES?), wherein the management module DSM evaluates if the overcurrent condition is still present or not.

If the overcurrent condition is not present (branch No), from seventeenth step 2017, the method provides for the passage to the already described fourteenth step 2014.

Instead, if in the seventeenth step 2017, the management module DSM detects (branch Y) the presence of an overcurrent condition, the method provides for the passage to an eighteenth step 2018 (TSD ?), wherein the safety thermal test is performed, as described before.

If such a safety thermal test detects that the temperature of the chip including the power device HS is less than the safety thermal threshold $TH_{TSH}$ (branch No), the method continues to the above described eight step 2008.

Instead, if such safety thermal test of eighteenth step 2018 detects that the safety thermal threshold $TH_{TSD}$ has been reached (branch Y), the power device HS and devices present on the same chip are switched off, and the method continues to nineteenth step 2019.

It is noted that the driving method 2000, previously described with reference to FIG. 4, provides for, among other things, the switching-off of the power device HS when an evaluation of the temperature increase $T-T_0$ during the auto-recovery mode exceeds a predetermined thermal variation threshold $\Delta T_{max}$ (see twelfth step 2012). For example, such a threshold could be equal to 30° C.

With reference to the driving method of FIG. 4, such a temperature increase evaluation is performed based upon the temperature present values taken by the power device HS, measured by the temperature detecting module TDM of FIG. 3.

Figure 5:
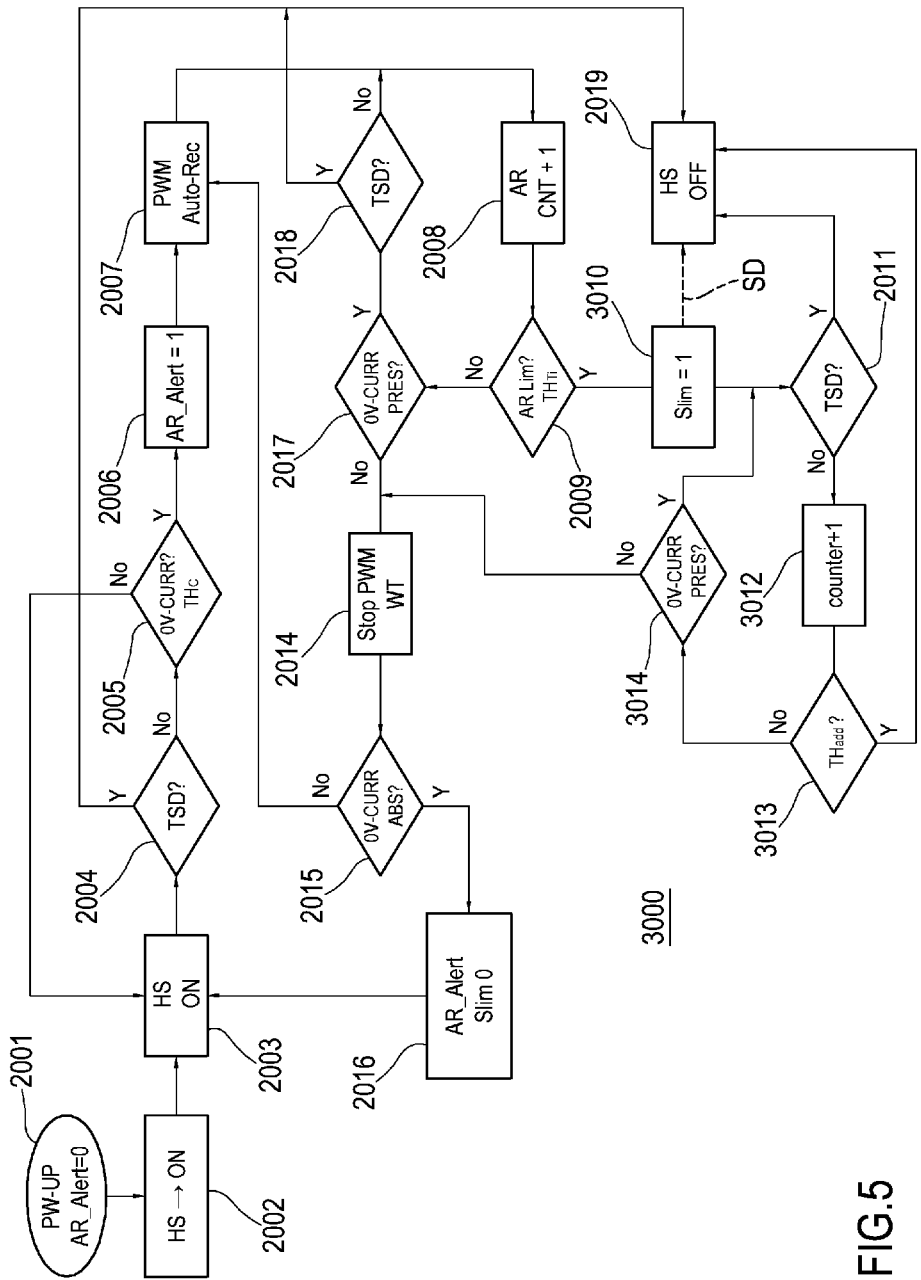
FIG. 5 shows by a flow chart, a second embodiment of a driving method implementable by the driving apparatus of FIG. 1.

According to another embodiment, the temperature increase evaluation during the auto-recovery mode can be performed by an estimate, and not by a direct measurement of temperature. To this end, FIG. 5 shows a further operation flowchart 3000 for a method of the driving apparatus 100. This further operation method comprises some steps similar or identical to the ones described with reference to the flowchart 2000 of FIG. 4 and which are indicated in FIG. 5 by the same reference numerals.

Particularly, according to the flowchart 3000 of FIG. 5, in step 2009, when the time range $T_I$ is equal to the time threshold $TH_{Ti}$ (branch Y), then an information step 3010 follows wherein the management module DSM supplies the limit signal $S_{lim}$ to the microcontroller 300, having a logic value for example equal to 1, indicating that time threshold $TH_{Ti}$ has been reached.

After the microcontroller 300 has performed the safety thermal test in the eleventh step 2011 and has verified (branch No) that the temperature has not reached the thermal safety threshold $T_{TSD}$, further flowchart 3000 provides for a further counting step 3012. In this further counting step 3012, the management module DSM evaluates (for example by counting clock pulses) an additional time interval $T_{add}$ between the instant wherein the reaching of time threshold $TH_{Ti}$ has been detected and an instant of current time Ti.

In a following time comparing step 3013 ($TH_{add}$ ?), the management module DSM compares the additional time interval $T_{add}$ with a further time threshold $TH_{Tadd}$.

If the additional time interval $T_{add}$ is less than the further time threshold $TH_{Tadd}$, a step verifying the presence of overcurrent 3014 (OV-CURR PRES ?) is performed. In the positive case (branch Y), the further flowchart 3000 continues to the above described eleventh step 2011. In the negative case (branch No), that is without an overcurrent condition, the further method continues to the above described fourteenth step 2014.

Returning to the time comparing step 3013, if the further time threshold $TH_{Tadd}$ has been reached (branch Y), the management module DSM can command, by the enabling signal HS_Enab, the power device HS to be deactivated, reaching in this way the nineteenth step 2019.

It is observed the time comparing step 3013, based on a further time threshold $TH_{Tadd}$, is an estimate of a temperature increase in the power device HS when the latter remains in the auto-recovery mode. Further time threshold $TH_{Tadd}$ can be determined based on a thermal pattern of power device.

It is also observed in the time comparing step 3013, the module DSM can, according to a particular embodiment, subordinate the deactivation of the power device HS to reaching of a maximum temperature value $T_{max}$ from the same power device. Alternatively, in place of the time comparing step 3013, the deactivation of the power device HS can be commanded when the management module DSM detects the maximum temperature value $T_{max}$ has been reached.

Figure 6:
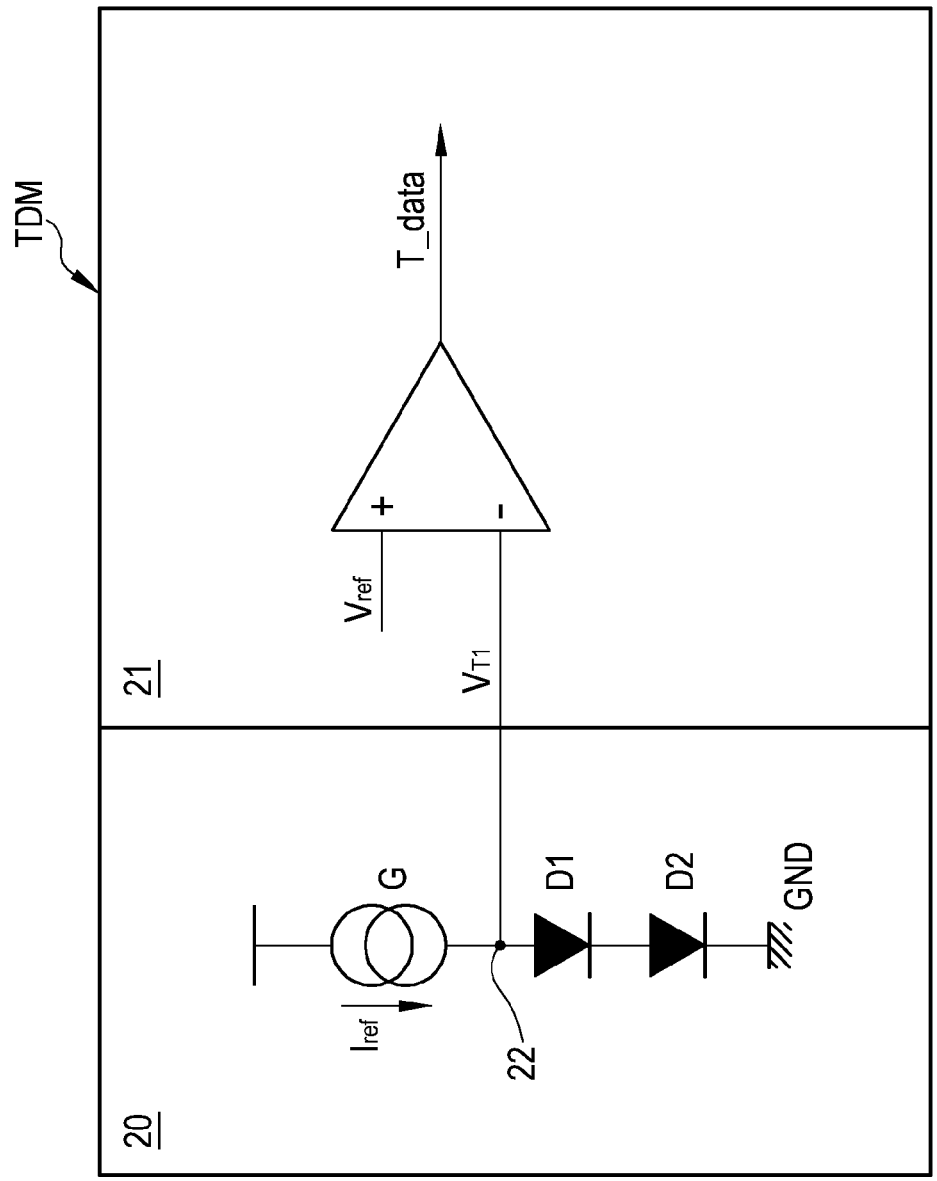
FIG. 6 shows a further particular embodiment of a module for detecting the temperature usable in the driving apparatus for implementing method of FIG. 5.

It is observed that the detection of the maximum temperature value $T_{max}$ reaching can be performed, according to a particular example, by a temperature detecting module TDM configured as shown in FIG. 6, more simple and economical than the one shown in FIG. 3.

The temperature detecting module TDM of FIG. 6 comprises a further detector 20 and comparator 21. Further detector 20 comprises a current reference circuit G (standard per se and, for example, based on a further bandgap voltage reference), configured to inject a reference current $T_{ref}$ in an output node 22. Output node 22 is connected to a further module sensitive to the temperature, comprising a first diode D1 and second diode D2. First diode D1 has a first anode connected to the output node 22, and a first cathode connected to a second anode of second diode D2, having a second cathode connected to ground terminal GND. First and second diodes D1 and D2 have corresponding electric resistances which vary as temperature varies; therefore, as temperature varies the electrical voltage at output node 22 also varies, with a negative thermal coefficient.

During the operation, at the output node 22 a further measurement electric voltage $V_{T1}$ is present indicating the temperature reached by the power device HS.

The comparator 21, standard per se, is configured to receive the further measurement electric voltage $V_{T1}$ at its inverting terminal, and compare it with a reference voltage $V_{ref}$ selected based on the maximum temperature value $T_{max}$. Output signal T_data will take two logic levels: one indicating that measured temperature is less than the maximum temperature value $T_{max}$, and a further value indicating that the exceeded temperature has reached a maximum temperature value $T_{max}$ Moreover, it is preferably noted, both for method of flowchart 2000 and the further method of flowchart 3000, the thermal safety test, performed by the same power device HS, is always enabled and is not just performed in the particular fourth 2004, eleventh 2011, eighteenth steps 2018.

Figure 7:
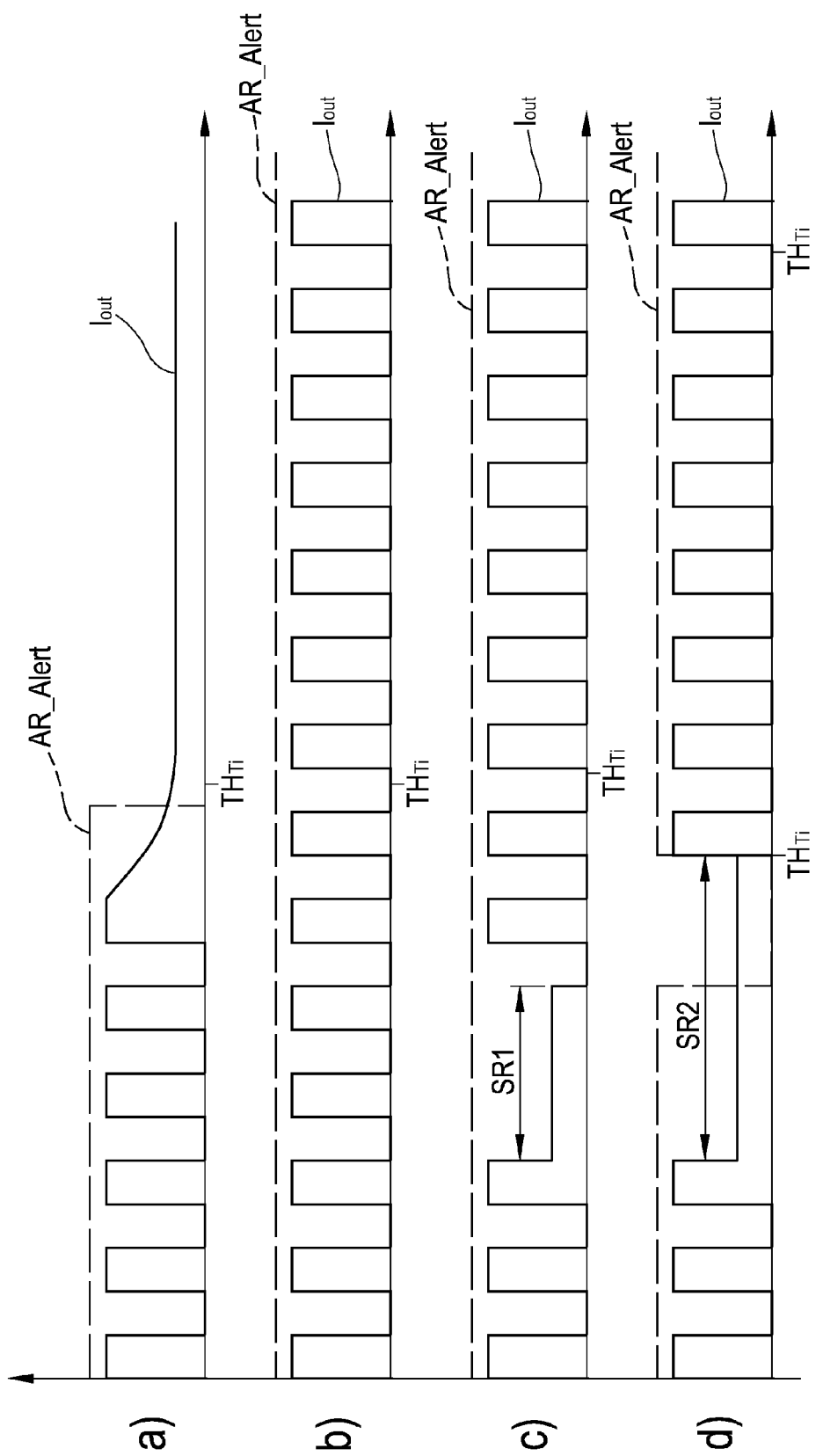
FIG. 7 schematically shows different trends of the output current of the power device and a warning signal generated by the driving apparatus, in different possible operative conditions.

FIG. 7 shows the trend of the warning signal AR_Alert and output current $I_{out}$ in different operative particular situations.

FIG. 7a) refers to a situation where an overcurrent condition occurs, and, therefore, the warning signal AR_Alert is taken to a logic value and the auto-recovery mode is performed by generating some PWM cycles for the output current. FIG. 7 also shows the time threshold $TH_{Ti}$ from which the temperature monitoring is activated according to flowchart 2000 (FIG. 4) or the temperature estimate based on a clock pulses count according to further flowchart 3000 (FIG. 5).

In the example of FIG. 7a), the output current $I_{out}$, before reaching time threshold $TH_{Ti}$, decreases below a predetermined threshold current $TH_c$, and therefore goes out from the overcurrent condition, the warning signal AR_Alert takes again a logic value 0, therefore the auto-recovery mode is no longer performed, but just a standard supplying of load 50. This situation can occur during the step of switching on the load 50 which does not have anomalies and requires a start-up current.

The example of FIG. 7b) refers to a permanent short-circuit situation, wherein the warning signal AR_Alert remains at logic level 1 also after time threshold $TH_{Ti}$ has been exceeded.

FIG. 7c) refers to a first example of an intermittent short-circuit condition. As observed from FIG. 7c), in a first suspension time internal SR1, the short-circuit is suspended, and, in other words, an overcurrent condition does not occur. According to what has been described with reference to fourteenth step 2014 of operation flowcharts 2000 and 3000, since such first suspension interval SR1 is less than the one between two overcurrent measurement events, the warning signal AR_Alert is held at logic value 1.

FIG. 7d) refers to a second example of an intermittent short-circuit condition. As it is known from FIG. 7d), in a second suspension time interval SR2, the short-circuit is suspended, and, in other words, an overcurrent condition does not occur. According to what has been described with reference to fourteenth step 2014 of operation flowcharts 2000 and 3000, since such a second suspension range SR2 is greater than the one between the two overcurrent measurement events, the warning signal AR_Alert is taken to a logic value 0. Afterwards, since there is again an overcurrent condition, the warning signal AR_Alert is again taken to logic value 1, and the time threshold $TH_{Ti}$ is set forward.

Figure 8:
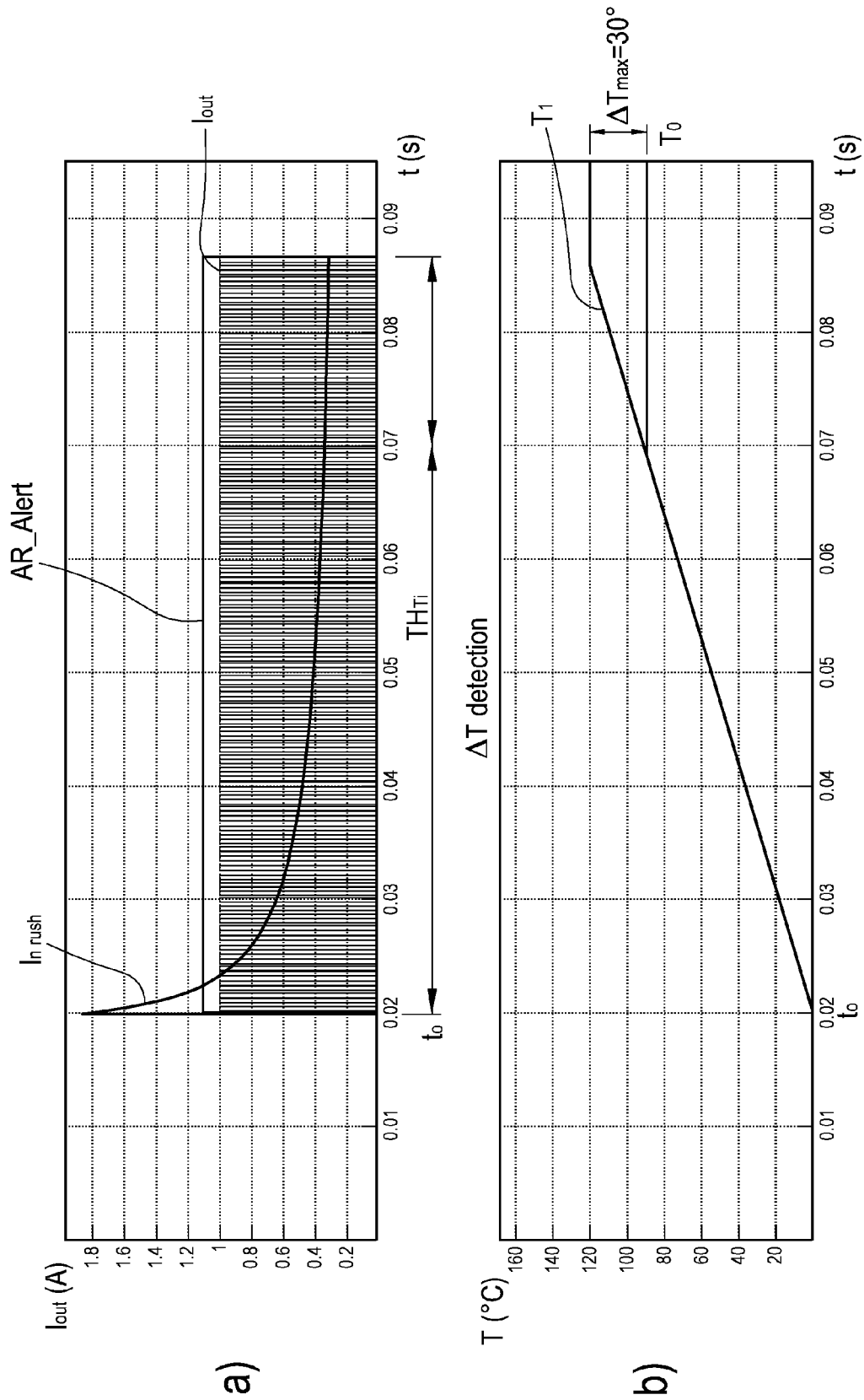
FIG. 8 refers to computer simulations and shows the output current trend of the power device, the trend of a warning signal and trend of the temperature of the power device in the implementation of method of FIG. 4, in a short-circuit condition.

FIG. 8a) shows a time trend of the output current $I_{out}$ and warning signal AR_Alert when a computer simulates the operation of the electric system 1000 configured for an electric load of 5 W, but in a short-circuit situation.

The 5 W electric load would show a start-up current Inrush shown in FIG. 8a). Upon switching on of the control module 200 and power device HS (at time to), an overcurrent condition is detected and consequently the warning signal AR_Alert is taken to a logic value 1, and the auto-recovery mode starts with an output current $I_{out}$ taking a trend of the PWM type. Curve T1 of FIG. 8b) shows the increasing trend of the power device HS temperature in such a situation.

The overcurrent condition and therefore the logic value 1 of the warning signal AR_Alert persists until the time threshold $TH_{Ti}$ is equal, in the computer simulation, to 50 msec (located in FIG. 8a) the at instant 0.07 sec. Upon reaching the time threshold $TH_{Ti}$, the temperature $T_0$ is acquired and the temperature monitoring T is activated.

Upon reaching thermal variation threshold $\Delta T_{max}$ equal, by the computer simulation, to 30° C., after about 15 msec, the power device HS is switched off, without continuing to the auto-recovery mode, and the warning signal AR_Alert is taken to logic value 0.

ADVANTAGES

The electric system 1000 and driving apparatus 100 have different advantages compared with the prior art. More specifically, the driving apparatus 100 is particularly strong to anomalies such as short-circuits or overloads, and offers great safety in the presence of temperature increases.

Particularly, the generation of signals, such as warning signal AR_Alert and limit signal $S_{lim}$, indicating the implementation of auto-recovery mode, and duration of such mode, enables both the management device DSM and microcontroller 300 to switch off the power device before an intervention of the power device HS protection functionality based on the temperature detections (thermal shut down).

However, the management module DSM does not prevent a switching-off of the power device HS required by the microcontroller 300, ensuring in this way the maximum protection against thermal increases.

The possibility of the management device DSM causing the power device HS switching-off independently from the microcontroller 300, offers a particular protection against overloads and short-circuits, also in case of microcontroller 300 malfunctions.

Moreover, the particular embodiment providing a waiting time between two overcurrent tests before exiting the auto-recovery mode, is particularly advantageous for correctly detecting also intermittent short-circuits.

Pursuant to tests performed by the Applicant, it was noted the driving apparatus 100 enables a substantial increase of power device HS duration compared with what occurred with prior art devices. Indeed, while, according to the prior art, using lateral-flow power devices, typical of BCD technology, power device duration is about of one million cycles. In contrast, with the control apparatus 200, the power device life reaches about seven millions cycles, and therefore a life of lateral-flow power devices is comparable to the life of VIPower devices.

That which is claimed is:
1. A driving apparatus for an electric load comprising:
  a power device having a control terminal and an output terminal for an output current to be supplied to the electric load; and a control module configured to
    drive said power device in an auto-recovery mode, by switching between activation and deactivation responsive to an overcurrent condition wherein the output current reaches a current threshold, with said power device remaining in a fully on state when the output current reaches the current threshold,
    evaluate a first time interval between a time when the overcurrent condition occurs, and a first time,
    generate a limit signal when the time interval is equal to a time threshold, and
    drive said power device to a switching-off condition at least as a function of the limit signal;
said control module comprising a control and drive module configured to
    evaluate a temperature increase of said power device associated with a second time interval and between generating the limit signal and a second time, and
    generate a first signal for switching off said power device when the evaluated temperature increase reaches a first threshold temperature.

2. The driving apparatus according to claim 1, wherein said control and drive module further comprises a thermal detecting module configured to measure at generating the limit signal, a first temperature of said power device, and a second temperature of said power device associated with the second time.

3. The driving apparatus according to claim 2, wherein said control and drive module is further configured to:
    evaluate a temperature increase based on a difference between the first and second temperatures; and
    generate the first signal for switching off said power device when the temperature increase reaches the first threshold value indicative of a first threshold temperature.

4. The driving apparatus according to claim 3, wherein said control and drive module is configured to:
    evaluate the temperature increase based on evaluating a third time interval between generating the limit signal, and a third time; and
    generate the first switching-off signal when the third time interval reaches the first threshold value indicating a further time threshold.

5. The driving apparatus according to claim 4, wherein said control module comprises a control device distinct from said control and drive module, and configured to:
    supply a signal for switching on said power device, to said control and drive module; and
    supply a second switching-off signal to said control and drive module to cause the switching off of said power device for conditions detectable by said control device.

6. The driving apparatus according to claim 5, wherein said power device comprises a safety thermal module configured to:
    detect a third temperature associated with said power device; and
    cause the switching-off of said power device when the third temperature reaches a second temperature threshold.

7. The driving apparatus according to claim 6, wherein said control and drive module is configured to generate said first switching-off signal independently from generating the second switching-off signal by the control device and independently from the switching-off caused by the safety thermal module.

8. The driving apparatus according to claim 1, wherein said control module further comprises a module for detecting an overcurrent condition coupled to said power device, and configured to supply an overcurrent signal adapted to assume a first value indicating that the output current has reached or exceeded the current threshold, and a second value indicating that the output current is less than the current threshold.

9. The driving apparatus according to claim 8, wherein said control module is configured to generate a warning signal adapted to:
    take a first digital value when the overcurrent signal takes the first value, and indicate application of the auto-recovery mode; and
    take a second digital value when overcurrent signal takes the second value, and indicate that the auto-recovery mode has not been applied.

10. The driving apparatus according to claim 9, wherein said control module comprises a control device; and wherein said control module is configured to supply the warning signal to said control device.

11. The driving apparatus according to claim 1, wherein said control module is configured to:
    perform a plurality of checks of the overcurrent condition when said power device is in the auto-recovery mode;
    drive said power device outside the auto-recovery mode for driving it in a standard load supplying mode when said plurality of overcurrent checks generate negative results.

12. The driving apparatus according to claim 11, wherein said control module is further configured to perform the plurality of checks according to the following modes:
    performing a first check of the overcurrent condition having a negative result;
    waiting a pause time wherein said power device is taken outside the auto-recovery mode, and operating in the standard load supplying mode;
    performing a second check of the overcurrent condition having negative result; and
    holding said power device in the standard load supplying mode.

13. The driving apparatus according to claim 1, wherein at least one of the time threshold and first threshold is selected for detecting at least one of a short-circuit condition and an overload condition.

14. The driving apparatus according to claim 1, wherein said control and drive module further comprises:
    a first logic port configured to receive the first switching-off signal and the second switching-off signal, and generate a combination signal;
    a driving module for said power device, configured to receive the combination signal, and generate a driving signal for said power device to drive its activation and deactivation; and
    a management module configured to receive an overcurrent signal, and generate a warning signal and first switching-off signal.

15. The driving apparatus according to claim 14, wherein said management module comprises a state machine.

16. The driving apparatus according to claim 1, wherein said power device comprises a high-side configured MOSFET and said control module is implemented by bipolar CMOS DMOS technology.

17. An electronic device comprising:
    a power device configured to generate an output current; and
    a controller coupled to said power device and configured to drive said power device in an auto-recovery mode, by switching between activation and deactivation based upon an overcurrent condition, with said power device remaining in a fully on state when the overcurrent condition is reached, evaluate a first time interval between when the overcurrent condition occurs and a first time, generate a limit signal when the time interval is equal to a time threshold, and drive said power device to a switching-off condition based upon the limit signal;

said controller is configured to evaluate a temperature increase of said power device associated with a second time interval and between generating the limit signal and a second time, and generate a first signal for switching off said power device when the evaluated temperature increase reaches a first threshold temperature.

18. The electronic device according to claim 17, wherein said controller is configured to measure at generating the limit signal, a first temperature of said power device, and a second temperature of said power device associated with the second time.

19. The electronic device according to claim 18, wherein said controller is configured to:

evaluate a temperature increase based on a difference between the first and second temperatures; and generate the first signal for switching off said power device when the temperature increase reaches the first threshold value indicative of a first threshold temperature.

20. The electronic device according to claim 18, further comprising an electric load coupled to said power device.

21. The electronic device according to claim 20, wherein said electric load comprises an electric component attachable to a motor vehicle.

22. A method for driving an electric load comprising:

driving a power device coupled to the electric load in an auto-recovery mode, by switching between activation and deactivation based upon an overcurrent condition, with the power device remaining in a fully on state when the output current reaches the current threshold;

evaluating a first time interval between when the overcurrent condition occurs and a first time;

generating a limit signal when the time interval is equal to a time threshold;

driving the power device to a switching-off condition based upon the limit signal;

evaluating a temperature increase of the power device associated with a second time interval and between generating the limit signal and a second time; and generating a first signal for switching off the power device when the evaluated temperature increase reaches a first threshold temperature.

23. The method according to claim 22, further comprising measuring at generating the limit signal, a first temperature of the power device, and a second temperature of the power device associated with the second time.

24. The method according to claim 23, further comprising:

evaluating a temperature increase based on a difference between the first and second temperatures; and generating the first signal for switching off the power device when the temperature increase reaches the first threshold value indicative of a first threshold temperature.

25. The method according to claim 22, wherein the electric load comprises an electric component attachable to a motor vehicle.

* * * * *